No. 887,576. PATENTED MAY 12, 1908.
S. BAYAS.
RAILWAY SIGNAL.
APPLICATION FILED APR. 15, 1907.
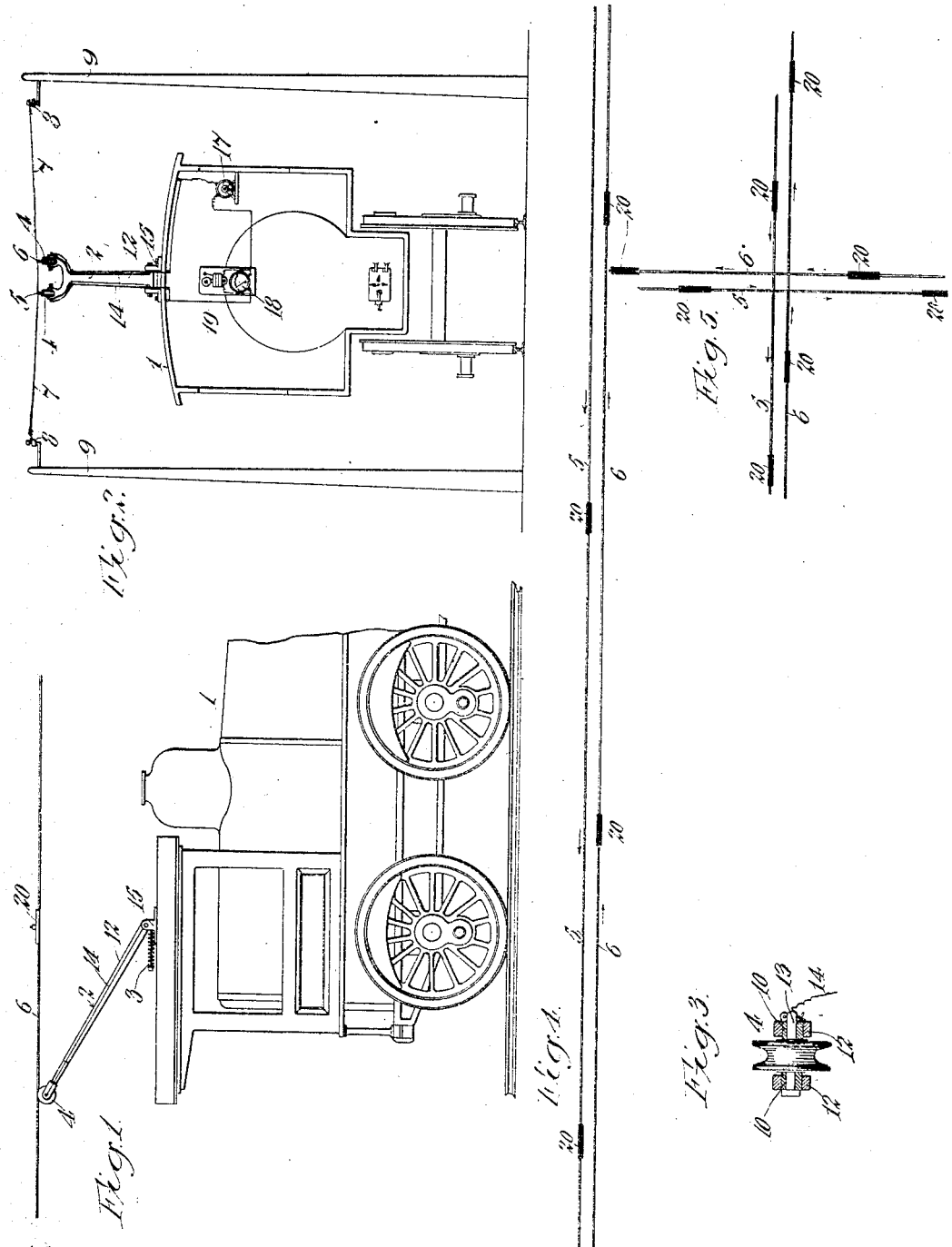

UNITED STATES PATENT OFFICE.

SOFRONY BAYAS, OF LOS ANGELES, CALIFORNIA.

RAILWAY-SIGNAL.

No. 887,576.   Specification of Letters Patent.   Patented May 12, 1908.

Application filed April 15, 1907. Serial No. 368,444.

*To all whom it may concern:*

Be it known that I, SOFRONY BAYAS, a subject of the Emperor of Austria-Hungary, residing at Los Angeles, in the county of Los Angeles and State of California, have invented a new and useful Railway-Signal, of which the following is a specification.

The object of this invention is to safeguard trains from collision while on the same track or on intersecting tracks.

In the accompanying drawings:—Figure 1 is a side elevation of a portion of an engine, showing a portion of a signaling conductor over the track and the means for taking current therefrom. Fig. 2 is a cross section of the cab, showing, diagrammatically, the signal connections and showing in elevation the overhead conductors and the trolley means therefor. Fig. 3 is a detailed section of the trolley. Fig. 4 is a plan of a portion of the sectional conductors as applied over a track. Fig. 5 is a plan showing the application of the conductors at the crossing.

Referring to Figs. 1 and 2, 1 designates an engine on which is mounted a trolley 2 having an operating spring 3 to press the trolley wheel 4 upwardly against conductors 5, 6, mounted over the track and supported by suitable means such as cross suspensions 7, insulating hangers 8 and posts 9.

The trolley 2 has two trolley wheels 4, each of which is insulated from the fork 12 of the trolley bar 2 by insulating bushings 10, a connection being made to the outer end portion of the shaft 13 of the trolley wheel and conductors 14 being led from the respective trolley wheels down to the pivot 15 of the trolley and thence into the cab. These conductors or wires are included in a circuit with a generator 17, a volt meter 18 and a bell 19 connected in parallel with the volt meter.

The conductors 5, 6 along and over the track are divided into sections, separated by section insulators 20, each section being of any desired length, for example, of a mile, or two miles, and the breaks or section insulators, of the sections, on the opposite sides, breaking joint or being alternated in position as shown in Fig. 3, so that the breaks on one side come half way between the breaks on the other side. When the engine is on the track it will present a given polarity, say plus, from the generator side of the circuit through a trolley wheel 4 to the sectional conductors 6 on one side and an opposite polarity (negative) from the other side of the circuit through the trolley wheel to the sectional conductor 5.

Normally, or when there is no other train on the same section, the circuit is open circuited at the breaks between the sections, but when another train comes onto the same section, that is with its trolleys bearing on the parts of the same two sectional conductors, then the circuit is closed to said other train, and it will be noted that the polarity presented by the generator of said other train, if the trains are running in opposition, will be in the same direction around the circuit as that of the first train, one train tending to cause current to flow from conductor 5 through the cab signal circuit to conductor 6 and the generator in the other train tending to force the current from generator 6 through the cab signal circuit therein to conductor 5, so that the effect is accumulative. If the trains are going in the same direction and the forward train is stationary, its cab circuit will operate to close the connection between the conductors 5 and 6 so that when the other train comes on the same section it will operate the signal devices in the cabs of both engines.

Fig. 5 shows the application of the invention to a crossing where the two sets of conductors 5, 6 cross one another and are connected in pairs as indicated, so that if two trains are approaching a crossing, each train being provided with the section devices as shown in Figs. 1 and 2, the signal will be rung in the cabs of both engines.

What I claim is:—

1. In an electric railway signal, a track, two conductors divided into insulated sections, and an engine on the track provided with a source of electrical energy, and a signal electrically connected with said source and a trolley on the engine provided with a forked harp, a shaft insulatedly mounted in each fork, one of which is electrically connected with said signal and the other one with the source of energy, and a trolley wheel on each shaft and in engagement with one of said conductors.

2. In an electrical railway signal, a track, two conductors thereover, each comprising insulated sections, the breaks of the two conductors alternating with each other, two vehicles on the track, each provided with a source of electrical energy, and a signal electrically connected therewith, a trolley on each vehicle provided with a forked harp, a trolley wheel insulatedly mounted in each fork in engagement with one of said conductors, and a wire electrically connected with each wheel, one of which wires is connected with the source of energy and the other one is connected with the signal.

In testimony whereof, I have hereunto set my hand at Los Angeles, California this 5th day of April 1907.

SOFRONY BAYAS.

In presence of—
  GEORGE T. HACKLEY,
  LOUIS W. GRATZ.